(12) United States Patent
Kopton et al.

(10) Patent No.: US 9,919,389 B2
(45) Date of Patent: Mar. 20, 2018

(54) METHOD AND TOOL FOR PRODUCING AN EXACT-FIT CYLINDRICAL BORE BY REMOVAL OF MATERIAL FROM AN EXISTING BORE WITH A FINISHING ALLOWANCE

(71) Applicant: AUDI AG, Ingolstadt (DE)

(72) Inventors: Peter Kopton, Kösching (DE); Eugen Maurer, Ober-Mörlen (DE)

(73) Assignee: Audi AG, Ingolstadt (DE)

( * ) Notice: Subject to any disclaimer, the term of this patent is extended or adjusted under 35 U.S.C. 154(b) by 713 days.

(21) Appl. No.: 14/385,418

(22) PCT Filed: Mar. 15, 2013

(86) PCT No.: PCT/EP2013/000803
§ 371 (c)(1),
(2) Date: Dec. 22, 2014

(87) PCT Pub. No.: WO2013/135392
PCT Pub. Date: Sep. 19, 2013

(65) Prior Publication Data
US 2015/0158132 A1    Jun. 11, 2015

(30) Foreign Application Priority Data

Mar. 16, 2012 (DE) .......... 10 2012 005 191
Apr. 17, 2012 (DE) .......... 10 2012 007 514

(51) Int. Cl.
*B23P 13/02* (2006.01)
*B23C 3/00* (2006.01)
(Continued)

(52) U.S. Cl.
CPC .............. *B23P 13/02* (2013.01); *B21D 28/34* (2013.01); *B23B 27/00* (2013.01); *B23B 35/00* (2013.01);
(Continued)

(58) Field of Classification Search
CPC . Y10T 409/501804; Y10T 409/502952; Y10T 409/503116; Y10T 29/5115;
(Continued)

(56) References Cited

U.S. PATENT DOCUMENTS 1,310,934 A * 7/1919 Suverkrop et al. .... B23D 37/00
407/16
1,394,079 A * 10/1921 Fuchs .................... B23D 37/16
409/261
(Continued)

FOREIGN PATENT DOCUMENTS

CH        369004      6/1963
CN       1038416      1/1990
(Continued)

OTHER PUBLICATIONS

International Search Report issued by the European Patent Office in International Application PCT/EP2013/000803 dated Jun. 25, 2013.
(Continued)

*Primary Examiner* — Erica E Cadugan
(74) *Attorney, Agent, or Firm* — Henry M. Feiereisen LLC

(57) ABSTRACT

The provided method and material-removing tool serve for producing an exact-fit cylindrical bore with a high degree of surface quality and a length that may be a multiple of the diameter from an existing bore with a finishing allowance. In order to reduce the time taken for the finishing by means of a reamer to be performed, it is proposed to use a tool in the form of an impact die, which is formed at the front end with a circular or substantially circular cutting edge, the diameter of which corresponds to the nominal diameter of the bore to be produced, and which tapers from directly behind the cutting edge or behind a front region of a certain length.

14 Claims, 11 Drawing Sheets

(51) Int. Cl.
| | |
|---|---|
| *B23C 5/00* | (2006.01) |
| *B23C 7/04* | (2006.01) |
| *B23B 35/00* | (2006.01) |
| *B23B 51/06* | (2006.01) |
| *B23D 5/02* | (2006.01) |
| *B23D 79/02* | (2006.01) |
| *B23D 79/04* | (2006.01) |
| *B23C 3/12* | (2006.01) |
| *B23D 11/00* | (2006.01) |
| *B23D 13/00* | (2006.01) |
| *B23D 37/22* | (2006.01) |
| *B23D 43/02* | (2006.01) |
| *B23B 27/00* | (2006.01) |
| *B23D 79/00* | (2006.01) |
| *B21D 28/34* | (2006.01) |
| *B23B 27/10* | (2006.01) |

(52) U.S. Cl.
CPC ............... *B23C 3/124* (2013.01); *B23C 5/00* (2013.01); *B23C 7/04* (2013.01); *B23D 5/02* (2013.01); *B23D 11/00* (2013.01); *B23D 13/00* (2013.01); *B23D 37/22* (2013.01); *B23D 43/02* (2013.01); *B23D 79/00* (2013.01); *B23D 79/04* (2013.01); *B23B 27/10* (2013.01); *B23B 2215/24* (2013.01); *B23B 2222/12* (2013.01); *B23B 2226/125* (2013.01); *B23B 2226/315* (2013.01); *Y10T 29/49995* (2015.01); *Y10T 29/5115* (2015.01); *Y10T 29/5168* (2015.01); *Y10T 408/03* (2015.01); *Y10T 408/356* (2015.01); *Y10T 408/45* (2015.01); *Y10T 408/78* (2015.01); *Y10T 408/89* (2015.01); *Y10T 409/303808* (2015.01); *Y10T 409/50082* (2015.01); *Y10T 409/500984* (2015.01); *Y10T 409/501804* (2015.01); *Y10T 409/502788* (2015.01); *Y10T 409/502952* (2015.01); *Y10T 409/503116* (2015.01); *Y10T 409/509348* (2015.01)

(58) Field of Classification Search
CPC . Y10T 409/400175; Y10T 409/406825; Y10T 408/34–408/356; Y10T 409/40–409/50984; B23C 7/04; B23D 37/14; B23D 37/16; B23D 79/04; B23D 5/02
USPC .................. 409/243–348; 408/22–30; 29/30
See application file for complete search history.

(56) References Cited

U.S. PATENT DOCUMENTS

| | | | | |
|---|---|---|---|---|
| 1,441,502 | A * | 1/1923 | Hook | B23D 43/02 285/916 |
| 2,209,025 | A * | 7/1940 | Kaplan | B23D 43/02 407/18 |
| 2,522,440 | A * | 9/1950 | Freter | B21D 28/34 29/90.01 |
| 2,548,702 | A * | 4/1951 | Chamberlain | B21J 9/06 29/34 R |
| 4,526,077 | A | 7/1985 | DeGuvera | |
| 4,762,043 | A | 8/1988 | Sneed | |
| 2006/0075871 | A1* | 4/2006 | Lockhart | B21D 28/34 83/688 |

FOREIGN PATENT DOCUMENTS

| | | |
|---|---|---|
| CN | 201124200 | 10/2008 |
| CN | 202105900 | 1/2012 |
| DE | 1 045 765 | 12/1958 |
| DE | 38 16 963 | 11/1989 |
| DE | 41 28 028 | 2/1993 |
| EP | 104694 A1 * | 4/1984 |
| WO | WO 2011/029957 | 3/2011 |

OTHER PUBLICATIONS

Chinese Search Report dated Dec. 3, 2015 with respect to counterpart Chinese patent application 201380025488.7.
Translation of Chinese Search Report dated Dec. 3, 2015 with respect to counterpart Chinese patent application 201380025488.7.

* cited by examiner

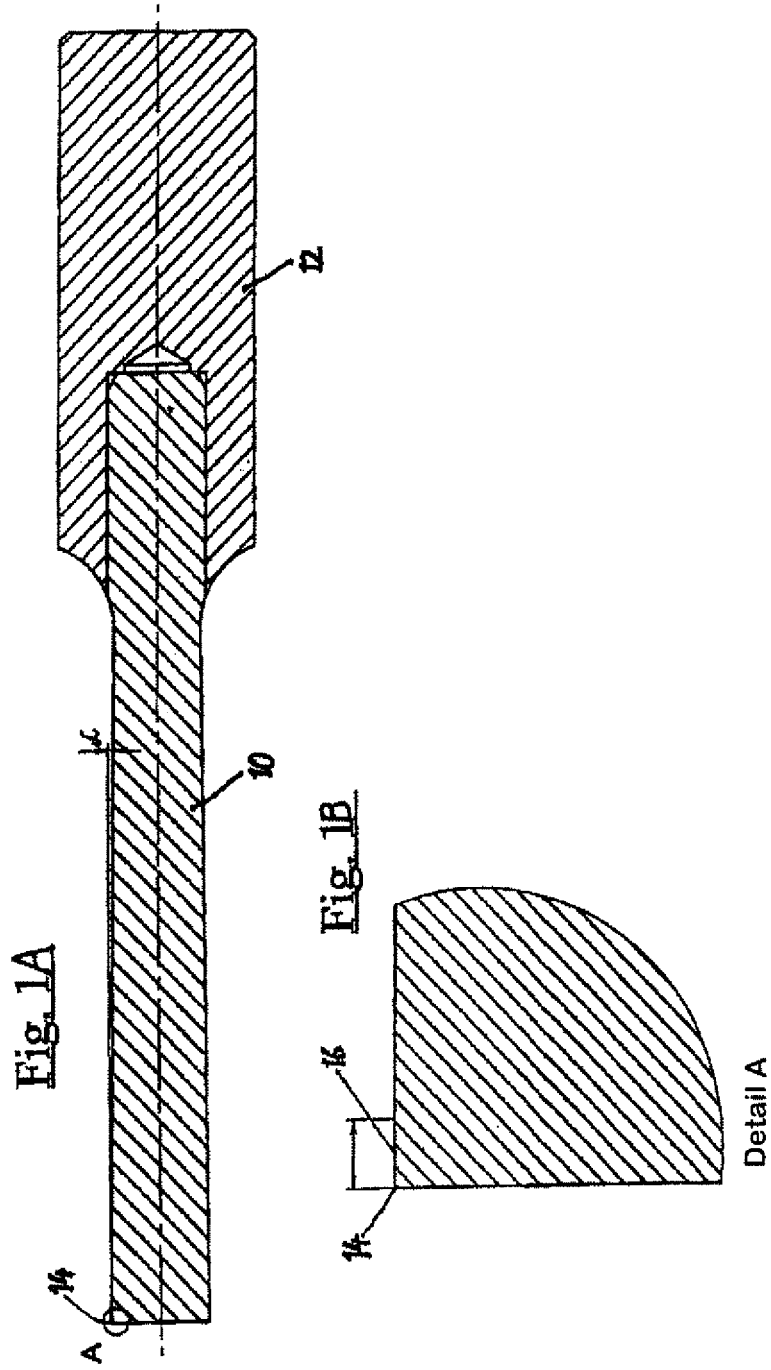

Section C-C

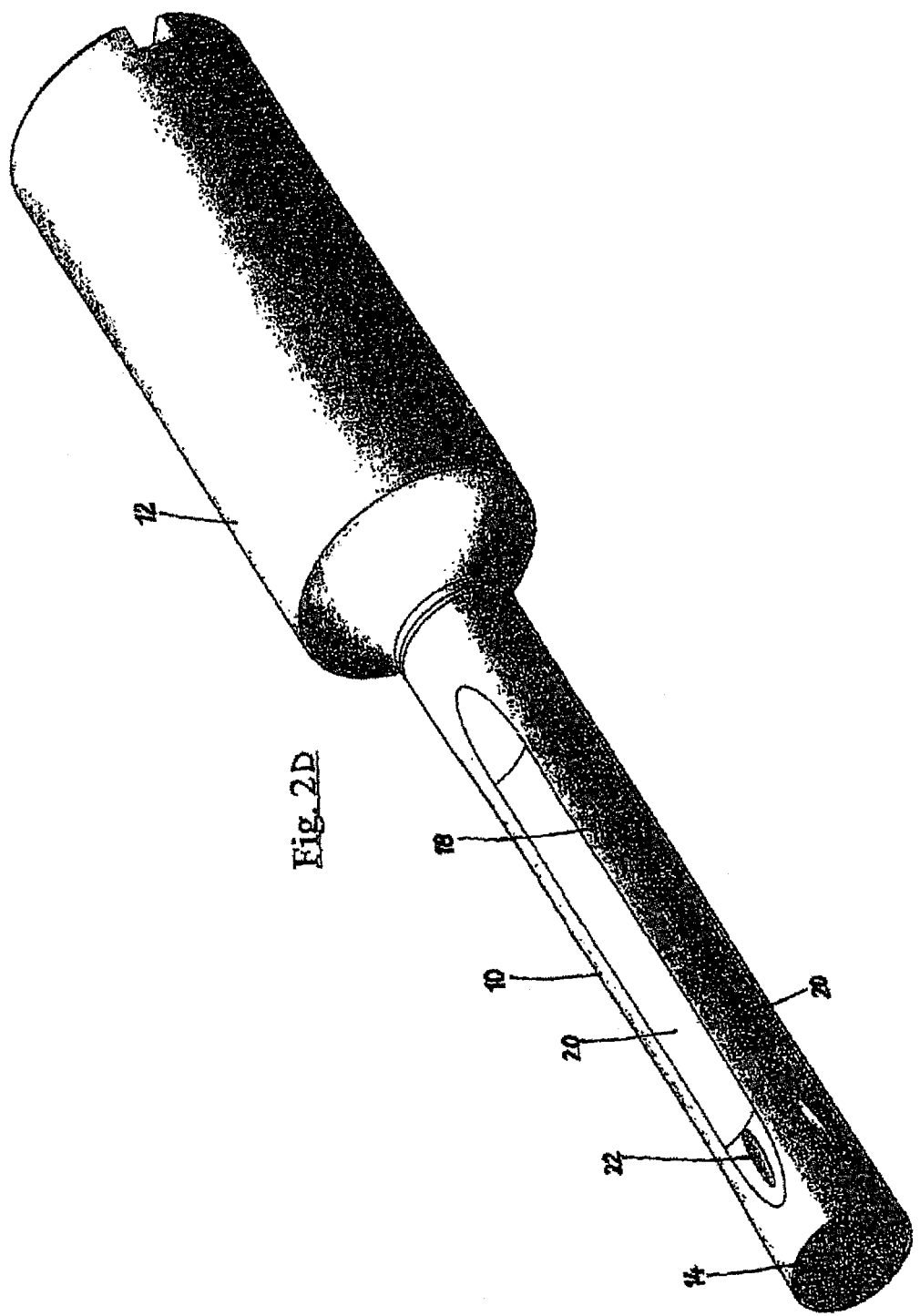

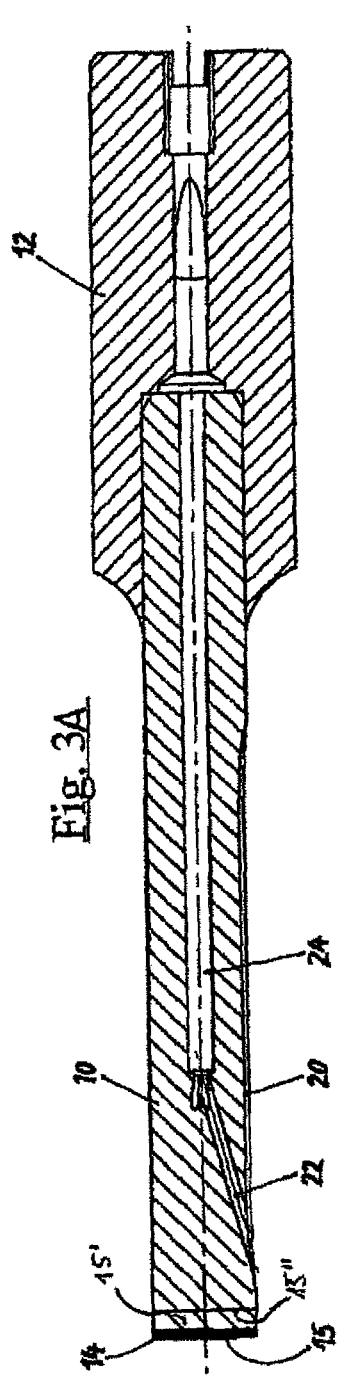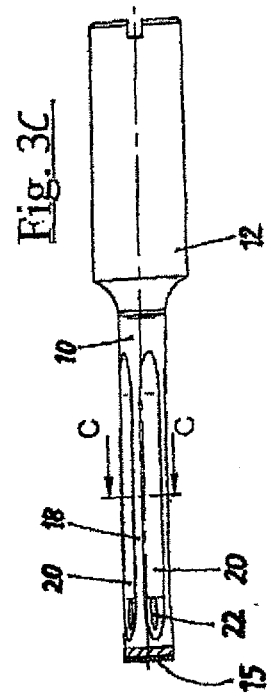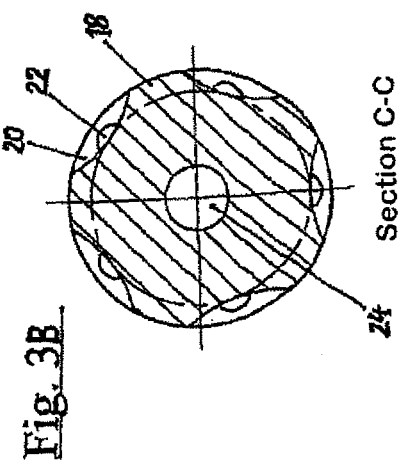

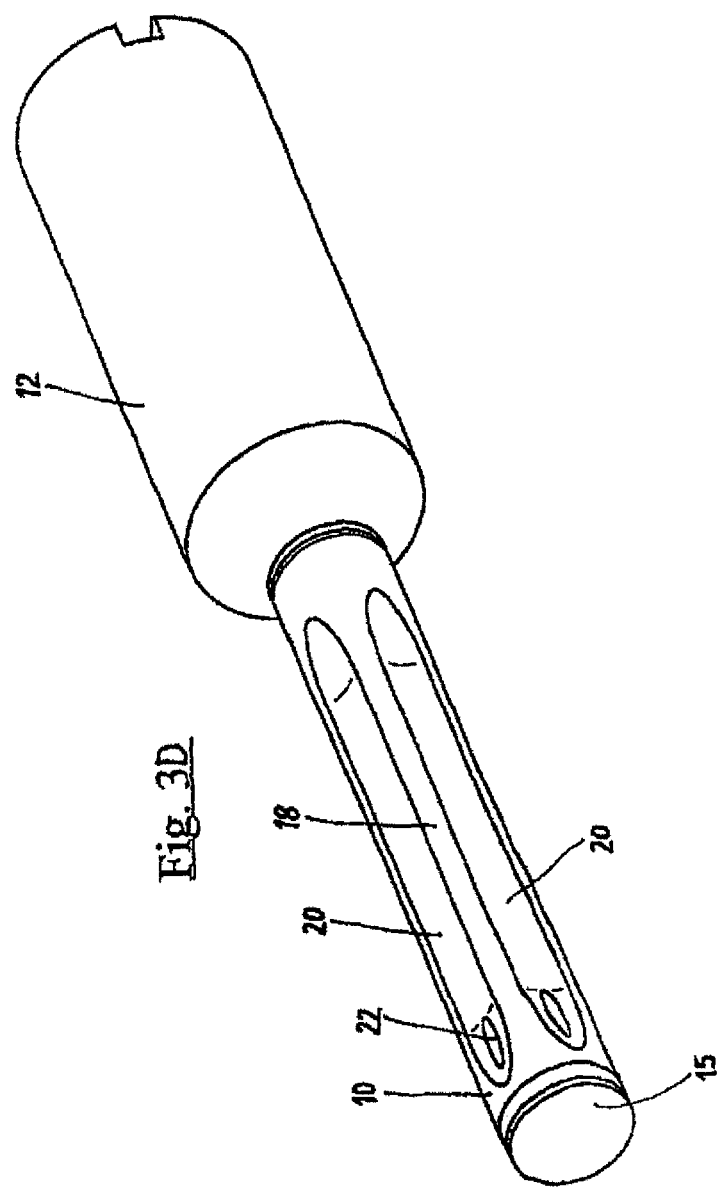

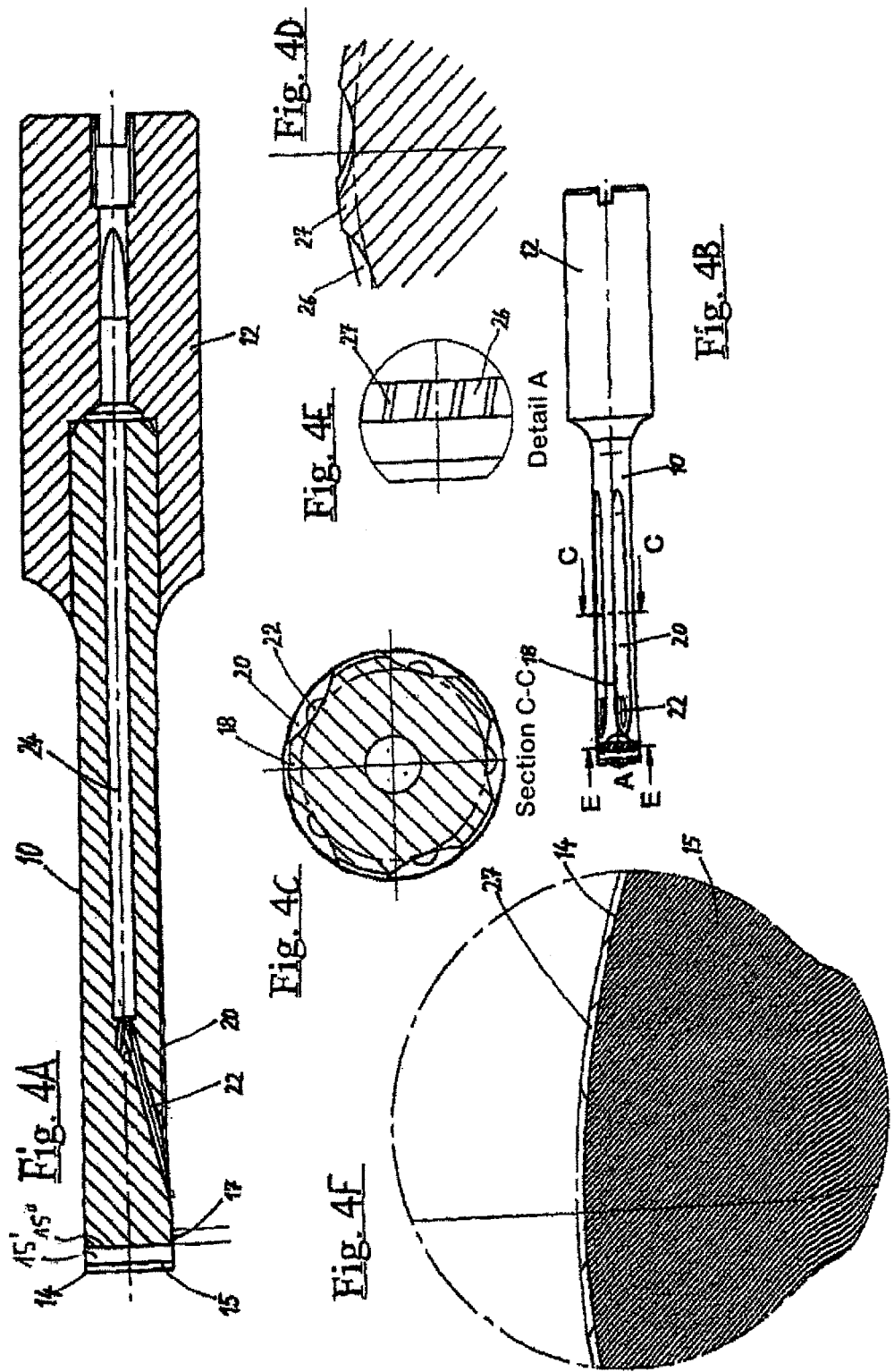

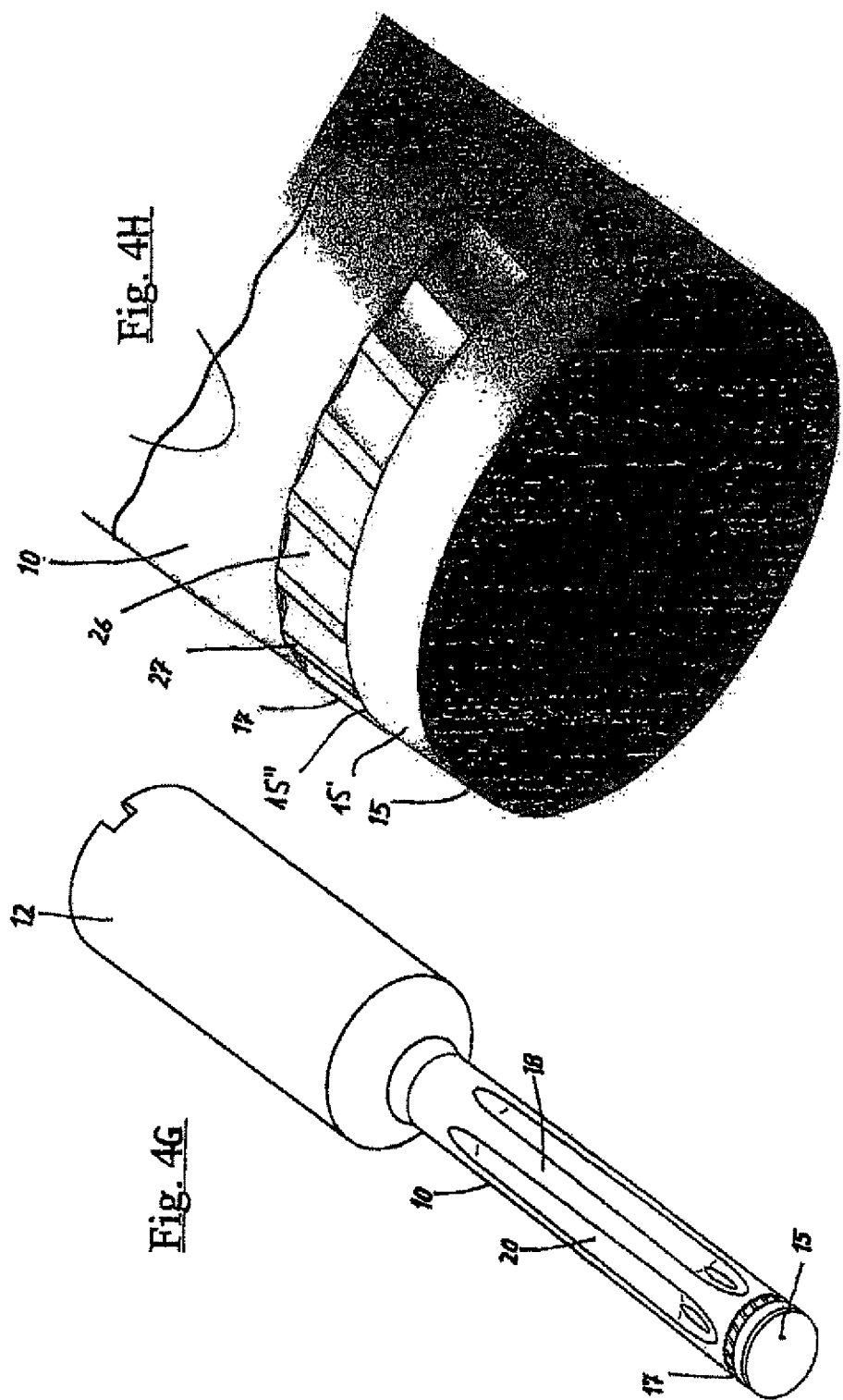

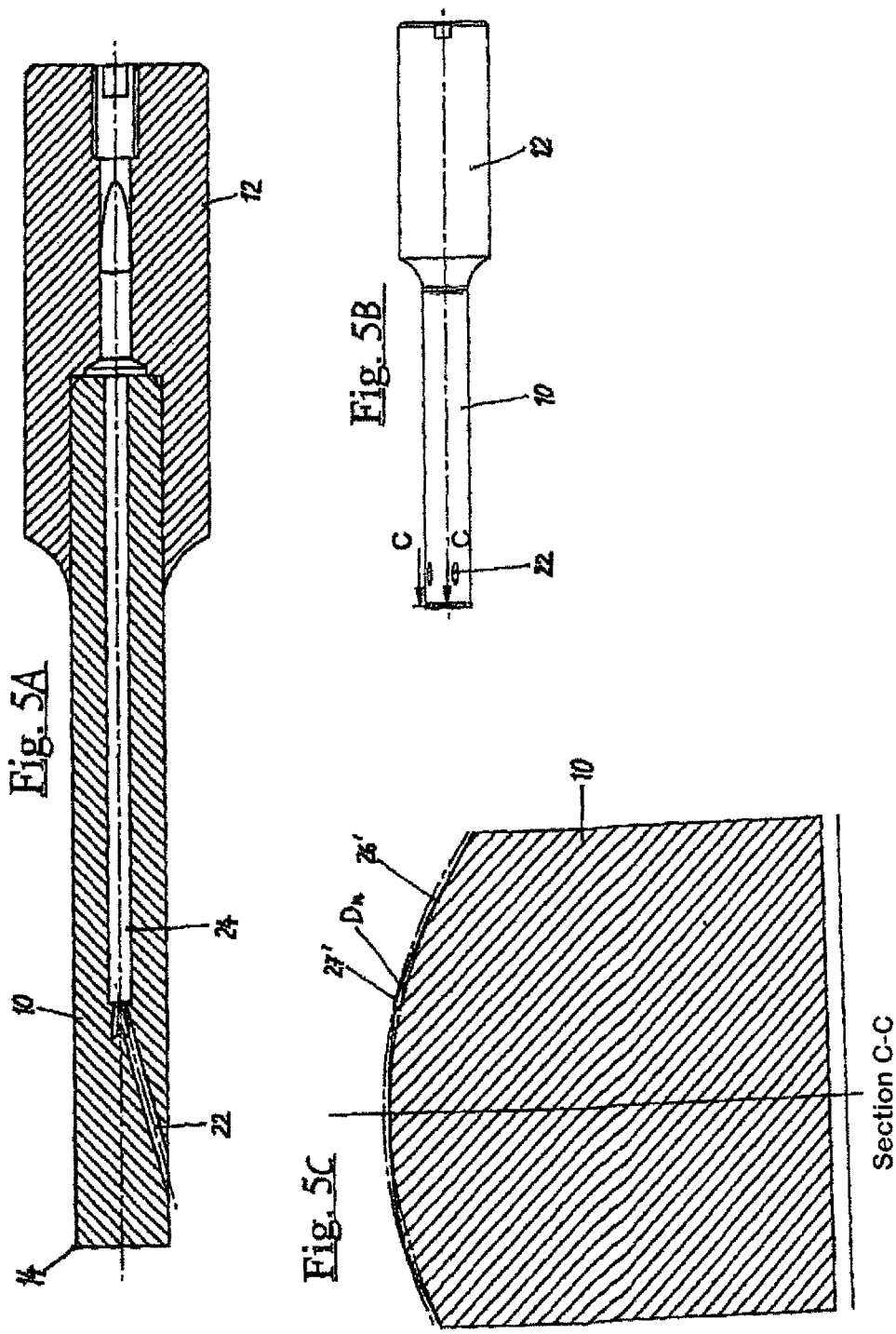

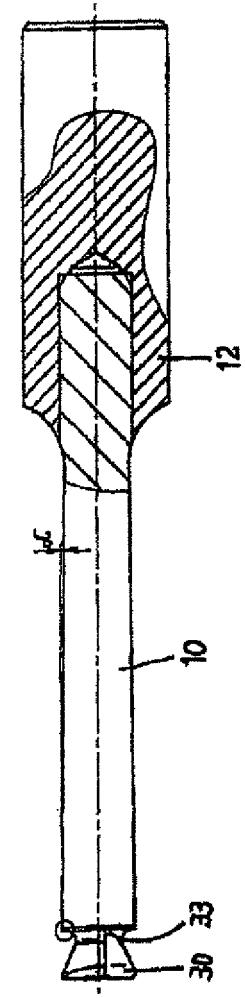
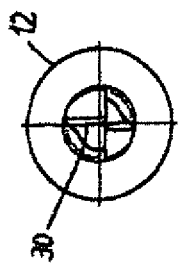
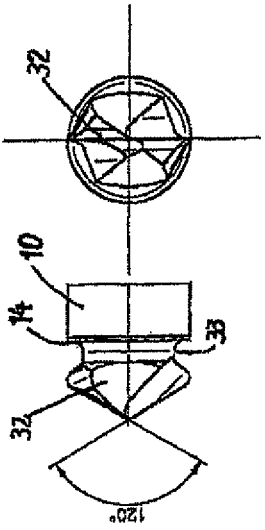
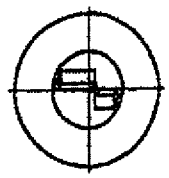
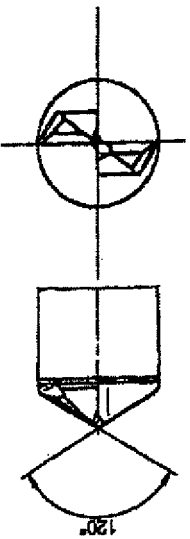
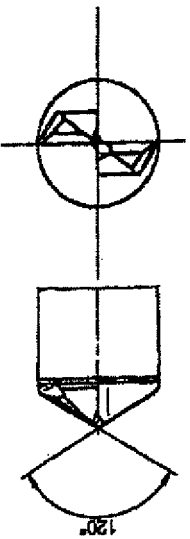

METHOD AND TOOL FOR PRODUCING AN EXACT-FIT CYLINDRICAL BORE BY REMOVAL OF MATERIAL FROM AN EXISTING BORE WITH A FINISHING ALLOWANCE

CROSS-REFERENCES TO RELATED APPLICATIONS

This application is the U.S. National Stage of International Application No. PCT/EP2013/000803, filed Mar. 15, 2013, which designated the United States and has been published as International Publication No. WO 2013/135392 and which claims the priority of German Patent Applications, Serial No. 10 2012 005 191.3, filed Mar. 16, 2012, and Serial No. 10 2012 007 514.6, filed Apr. 17, 2012, pursuant to 35 U.S.C. 119(a)-(d).

BACKGROUND OF THE INVENTION

The invention relates to a method and a tool for material-removing machining a precisely fitting, cylindrical bore with high surface quality and a length that can be a multiple of the diameter from an existing bore with a finishing allowance related to the radius.

For the production of non-circular bores, e.g. bores with a square cross section, splines or wedge profile, broaches and broaching mandrels are used, which usually have several stepped, farther projecting cutting teeth staggered from front to back. Broaching tools are typically used for profiling, but not for finish machining and precision machining of cylindrical bore with high surface quality.

If cylindrical bores are to be finish-machined in the last processing step, reamers are used with which an existing bore that still has a reaming allowance of a few tenths of a mm, is drilled. Reaming is a relatively slow process, whereby the reamer is moved axially along the bore axis and simultaneously rotated. If the axial feed is e.g. 0.1 mm per revolution, i.e. 380 revolutions are needed for reaming a 38 mm long bore and the working speed is 800 rpm, the processing step takes about half a minute. The long processing time has a particularly strong impact when workpieces such as engines are produced on a large scale, with each workpiece having a large number of bores that need to be machined very precisely and with a high surface quality, for example, as guides for the intake and exhaust valves of the cylinders of a four- or six-cylinder engine.

SUMMARY OF THE INVENTION

It is therefore an object of the invention to provide a method and a tool of the aforementioned type that allows a significant reduction in processing time compared with the conventional reaming operations without loss in precision and surface quality of generated cylindrical bores.

The above object is essentially solved by the method according to the invention in that the finishing allowance is peeled off to the nominal diameter of the finished bore during an axial stroke of an impact die having a circular or substantially circular cutting edge at its front end.

In particular, the invention is directed to a method for machining a cylindrical bore with a precise fit, a high surface quality and a length that can be a multiple of the diameter, starting from an existing bore with a finishing allowance that is characterized in that the finishing allowance is peeled off to the nominal diameter of the finished bore during an axial working stroke of an impact die having a circular or substantially circular cutting edge at its front end, wherein a rotary motion is superimposed on the axial working stroke, wherein the ratio of the working stroke and rotation speed is either constant or variable.

For carrying out the method according to the invention, a tool is proposed according to the invention, which has the form of an impact die that is formed at the front end with a circular or substantially circular cutting edge and whose diameter corresponds to the nominal diameter of the bore to be produced. Preferably, the impact die is tapered starting just behind the cutting edge or behind a front portion of a certain length. A substantially circular cutting edge refers here to a cutting edge that produces a substantially cylindrical bore for receiving and guiding a cylindrical shaft or axle with an exact fit, wherein small projections to generate shallow rifling in the surface of the bore that only locally affect the lubricant film will not be considered.

For the finish-machining of a semi-finished bore having a length of for example 38 mm, the impact die requires only a single forward and backward stroke and a processing time of for example about 0.6 sec. This is only about $\frac{1}{50}$ of the duration required for reaming with a reamer mentioned previously as an example. During the forward stroke, the cutting edge of the impact die peels of the reaming or finishing allowance from the bore wall, thereby widening the bore wall to the nominal diameter. On the return stroke, the material of the bore wall can be compacted and smoothed by the impact die. This results in a high contact ratio. Traces and surface structures left on the bore wall by the tool during the forward and return stroke extend axially, i.e. in the movement direction of the valve stems, when a purely axial impact movement is performed. Conversely, the traces and surface structures after machining with a reamer run transversely to the movement direction of the valves, so that initial wear is experienced already during run-in of the engine due to the friction of the valve stems transversely to the surface structures.

The cutting speed for finish-machining of the bores with an impact die can easily be between 5 m/min and 150 m/min, preferably between 30 and 60 m/min or more.

The thickness of the reaming or finishing allowance depends on the diameter of the bore and the material. It must be peeled off in a single stroke, i.e. push, and the cutting surface must then have the predetermined surface finish. For bore diameters of up to 20 mm, the finishing allowance is usually between 0.01 mm and 0.5 mm based on the radius, but may also be selected to be smaller or larger. To enable the impact die itself to push the chips peeled from the bore wall out of the bore, the impact die is preferably slightly longer than the bore to be produced. The chip formation takes place at the cutting edge at the front end of the impact die.

Starting either directly behind the cutting edge or behind a front cylindrical portion of a certain length, e.g. 0.1-0.4 mm, the impact die is tapered at the cutting edge in relation to its cross section. The degree of taper should be sufficient, on the one hand, so that the impact die does not rub against the bore wall behind a front region of a specific length, but should, on the other hand, remain stiff to safely guide the cutting edge.

The impact die is also guided on the bore wall, namely at the front part of the impact die, where the diameter is the identical to or only slightly smaller than the diameter of the cutting edge. The front part of the impact die can thus also perform the function of pressing material during the return stroke that has been displaced radially outwardly during the cutting operation and is then being pushed back into the bore outwardly again, thereby solidifying and smoothing the material. This not only applies to tools whose impact die tapers only behind a front portion of a certain length, but also to those tools where the taper already begins directly behind the cutting edge, but is still very slight at that location.

A special feature applies to tools for relatively long, narrow bores. It has been found to be advantageous to reduce the outer circumferential surface of the impact die to several relatively narrow axial ridges, wherein no taper or only a very small radial taper occurs along its length in the region of the bore so that the impact die can be supported and guided on the bore wall along its entire length or along a major part of its length. Depressions with a depth of a few hundredths to a few tenths of a millimeter may preferably be incorporated in the peripheral regions between the ribs, for example by grinding. In a preferred embodiment of the invention, coolant channels open into the front areas of the depressions, in another embodiment alternatively or additionally also into the front face of the impact die.

In a further improvement of the tool according to the invention, the lubrication of the valve stems in the bore may be improved by arranging in the front area of the impact die, behind the cutting edge formed at the front end, several circumferentially distributed radial projections, which protrude radially beyond the cutting edge by for example 1 to 3 hundredths of a mm and cut or press into the cylindrical bore wall corresponding rifling capable of holding a small amount of oil. The projections may be formed on or attached to the impact die, or machined from material disposed radially outside of the cutting edge by a laser.

A similar result is obtained when the cutting edge formed at the front end of the impact die is a polygon approximating a circular shape, the radius at the corners of the polygon is, for example, about 2 to 3 hundredths of a mm larger than in the central peripheral regions between the corner regions.

In a preferred embodiment, the latter radial projections or the corner regions of an overall substantially circular, polygonal cutting edge have thread-shaped axial extensions on the peripheral surface of the impact die, wherein during the machining of the bore, the impact die is not only driven axially, but at the same time also rotated commensurate with the pitch of the screw threads. In this way, rifling with a twist are produced in the bore wall, which may cause a valve to slightly rotate with each stroke and to thereby more uniformly load the valve along the circumference.

In order to avoid or reduce static friction, i.e. to obtain substantially dynamic friction, a rotary motion is added to the impact movement produced by the stroke of the impact die. The rotary motion may run synchronously or asynchronously with the impact movement. Synchronous means here that the rotary motion is superimposed on the impact motion, wherein the ratio of stroke and rotation speed is constant. In an asynchronous movement, no relationship exists between the impact speed and the rotation speed, i.e. there is no constant ratio. The rotation speed may correspond to a conventional machine speed from 1 to 22,000 rpm. Rotation speeds of 30,000 rpm or more may also be considered. The stroke is in particular between 5 m/min and 60 m/min or more.

According to another preferred embodiment of the invention, the front end of the impact die with the cutting edge and possibly also the front area with the identical or only slightly smaller diameter, with or without radial projections, may be composed of a hard metal, polycrystalline diamond (PCD), cubic boron nitride (CBN), or in a diamond layer produced by a CVD (Chemical Vapor Deposition) process. The diamond layer is available as solid material and is soldered to either a sub-carrier or directly on the impact die, in particular in a vacuum. The layer produced by a CVD process may have a thickness of 0.5 mm.

An adequate service life of the proposed tool for a large-scale production is achieved with these cutting materials.

In particular, the impact die may be composed entirely of a hard metal or may have at the front side cylindrical disk made of a hard metal forming the cutting edge or a cylindrical disk made of a cutting material such as PCD or CBN or a diamond layer produced by a CVD process. At least the cutting material PCD and CBN is deposited, for example soldered, on a carrier made of a hard metal, which in turn is integrally connected with the impact die, for example by soldering. The connection zone, i.e. the soldering zone, should extend at least at a distance of at least 3 mm from the front face made of the cutting material, in particular at a distance between 3 mm and 8 mm. At least in the connection zone or soldering zone, the impact die has a smaller diameter than the carrier, so that the connection zone or soldering zone is located outside the contact zone, i.e. the region where the material in which the bore is to be produced could nestle against the tool.

If a diamond layer produced by a CVD process is used as a cutting material, then the diamond layer is connected either with a carrier of a hard metal and thereafter soldered to the impact die or directly soldered onto impact die, in particular in a vacuum. The connection zone and soldering zone should also extend outside the contact zone.

Furthermore, according to an embodiment of the invention, the thickness of the cutting material, i.e. the hard metal used as a cutting material and the thickness of the PCD, CBN or of the diamond layer produced by the CVD process, is between 0.1 mm and 3 mm or more, wherein the thickness should be determined as a function of the elastic nestling of the workpiece through which the bore is to be pressed. This is intended to ensure that the impact die can be easily withdrawn in the region of the cutting material regardless of the contact between the material and the impact die.

If the cutting edge is a peripheral portion of a flat surface made of the cutting material, which is the front face of the impact die, then a ring made of the cutting material extending frontally on the tool can also be used.

With all the aforementioned embodiments, the material-removing conditions and the chip formation can be influenced by an appropriate design of the front face of the impact die, so that the front face forms at the cutting edge selectively a positive or negative machining angle. Also, regardless of the particular embodiment, the tool may be constructed as a single piece, e.g. from a hard metal or a tempered tool steel, or in two pieces, for example, from of a rear clamping shank made of steel and a front impact die made of a hard metal, which is soldered into a matching bore in the clamping shank and optionally connected at the front end by soldering to a cutting plate made of, for example PCD, on a support layer of hard metal.

BRIEF DESCRIPTION OF THE DRAWING

Other details, advantages and features of the invention will become apparent not only from the claims, from the features recited therein—severally and/or in combination—, but also from the following description of preferred exemplary embodiments illustrated in the drawing.

The drawing shows in:

FIG. 3A a central longitudinal section through an exemplary embodiment modified in comparison with FIG. 2A to the effect that the front end of the impact die is made of PCD, FIG. 3B a cross-section through the impact die taken along the section line C-C in FIG. 3C, FIG. 3C a side view of the tool of FIG. 3A, FIG. 3D a perspective view of the tool of FIGS. 3A-C;

FIG. 4A a central longitudinal section through a tool modified in comparison with FIG. 3A to the effect that radial projections exist behind the cutting edge that generate rifling in the bore wall FIG. 4B a side view of the tool of FIG. 4A, FIG. 4C a cross-section through the impact die taken along the section line C-C in FIG. 4B, FIG. 4D an enlarged detail of a cross section of the impact die taken along the section line E-E in FIG. 4B, FIG. 4E a detail of FIG. 4B on an enlarged scale, FIG. 4F a section of a front view of the impact die on an enlarged scale, FIG. 4G a perspective view of the tool of FIGS. 4A-F, FIG. 4H the front end of the impact die of FIG. 4G on an enlarged scale;

FIG. 6A a central longitudinal section through a tool modified in comparison with FIG. 1A to the effect that a milling head with smaller diameter for face milling of the bottom of a blind bore machined with the impact die is attached or formed axially before the cutting edge formed at the front end of the impact die, FIG. 6B an end view of the milling head of the tool according to FIG. 6 A, FIGS. 6C, D side view and front view of a drill head used in place of the milling head of FIGS. 6 A, B, FIGS. 6E, F side view and front view of a milling head attached or formed immediately before the impact die for face milling the bottom of a blind bore, and FIGS. 6G, H side view and front view of a drill head used in place of the milling head shown in FIGS. 6 E, F.

DETAILED DESCRIPTION OF PREFERRED EMBODIMENTS

Figure 1D:
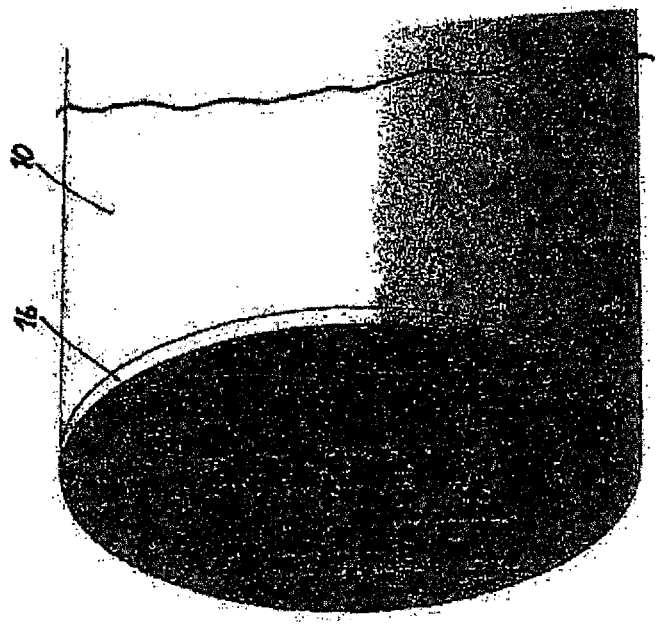
FIG. 1A a central longitudinal section through a machining tool for finish-machining of guide bores for automotive valves, FIG. 1B a detail of FIG. 1A in the region of the cutting edge of the tool on an enlarged scale, FIG. 1 C a perspective view of the tool of FIG. 1A, FIG. 1D a detail of FIG. 1C in the area of the front end of the tool on an enlarged scale.
Figure 1C:
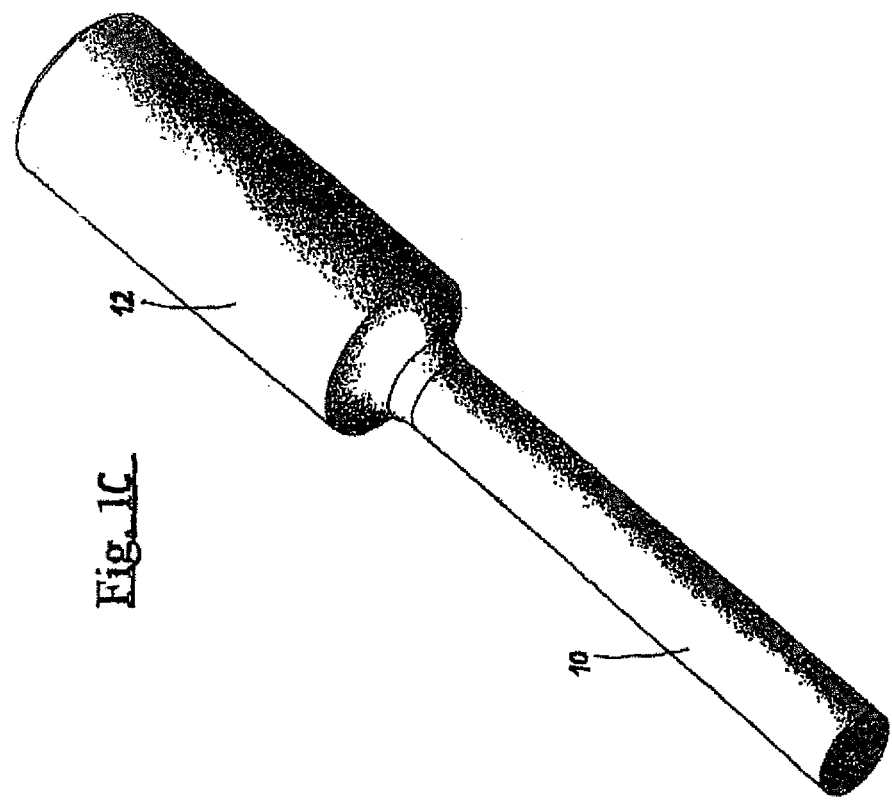

The tool shown in FIG. 1A is composed of an impact die 10 having a circular cross-section and made of a hard metal which is soldered with its rear end into a matching bore in a clamping shank 12. The clamping shank 12 is made, for example, of hardened tool steel. A pre-drilled bore in a workpiece, e.g. made of brass or steel bronze, should be expanded with the tool to the nominal diameter of the finished bore by material-removal of a finishing allowance of for example between 0.1 to 0.5 mm thickness, while achieving a surface quality comparable to machining with a reamer. Such quality demands are placed, for example, on the bores for valve guide in internal combustion engines.

The impact die according to FIG. 1A is formed at its front end with a substantially circular cutting edge 14, whose diameter corresponds to the nominal diameter of the bore to be produced. As shown in FIG. 1B, a front region or section 16 14 with an axial length of e.g. 0.1-0.2 mm extends from the cutting edge, where the impact die 10 is cylindrical with the same diameter as the cutting edge 14. Behind the cylindrical portion 16, the impact die 10 is conically tapered while maintaining its circular cross-section, wherein the inclination angle α between a straight line extending in a longitudinal section in the circumferential surface and a line parallel to the central longitudinal axis is in the present example 0.5°. The conical taper extends over a length that is greater than the length of the bore to be produced, for example over a length of about 40.5 mm for a bore length of 38 mm. This taper ensures that wall the rear area of the impact die does not rub against the bore.

Different from the aforedescribed embodiment, the taper of the impact die may start already directly at the cutting edge 14. The conicity of the taper of the taper could, however, be chosen to be significantly smaller, for example, only about one to two μm along longitudinal sections of 20 mm. In this case, the taper has only a minimal effect directly behind the cutting edge, so that it can be assumed that the front section 16 of FIG. 1B has practically still the same diameter as the circular cutting edge 14. Therefore, the front portion 16 of the impact die 10 retains also in this version its guiding and smoothing function.

Figure 2A:
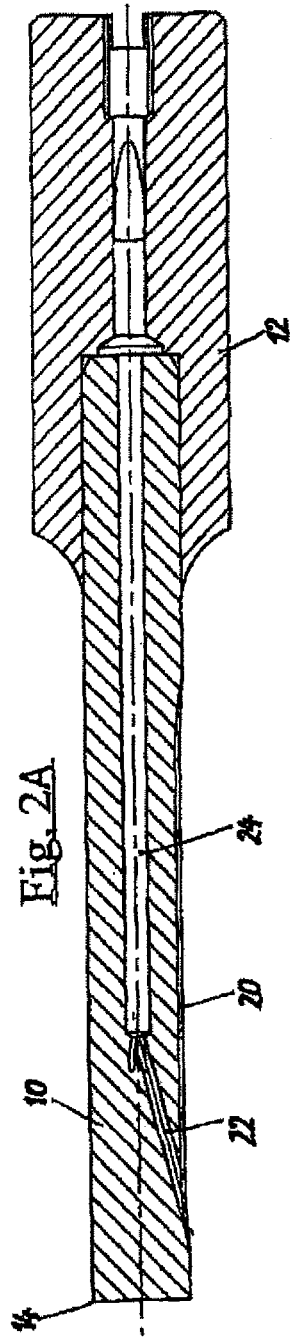
FIG. 2A a central longitudinal section through a tool modified in comparison with FIG. 1 to the effect that his impact die has axial ridges and depressions between the ridges, into which coolant channels open, FIG. 2B a cross section through the impact die of the tool taken along the section line C-C in FIG. 2C, FIG. 2C a side view of the tool of FIG. 2A, FIG. 2D a perspective view of the tool of FIGS. 2A-C.
Figure 2C:
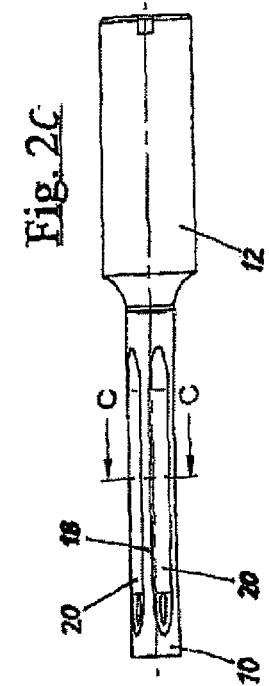
Figure 2B:
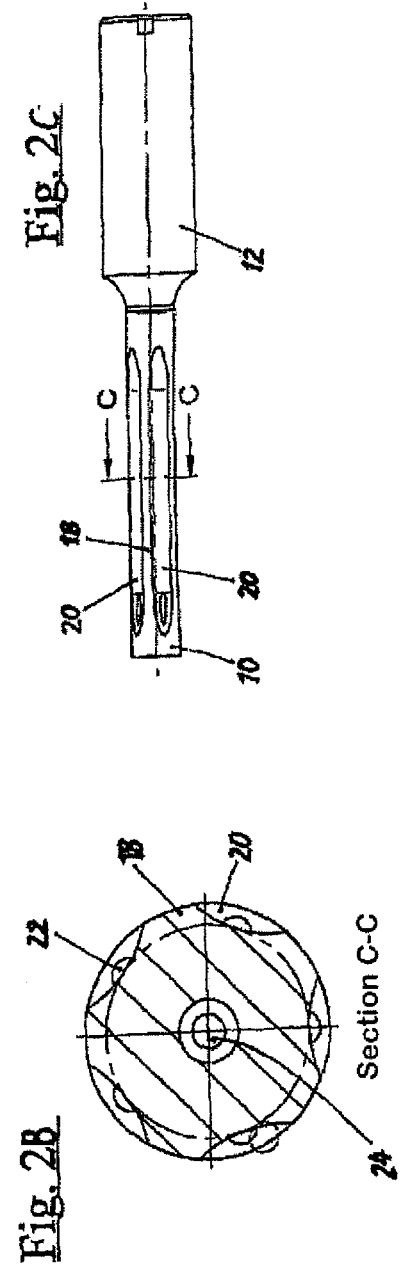

In contrast to FIG. 1A, of the impact die 10 in the embodiment of FIG. 2A does not have a circular cross-section, but has instead an outer peripheral surface which is reduced to a plurality of axially extending ribs 18 (see FIGS. 2B-D). Depressions 20 having a depth of, for example, 0.05 to 0.5 mm are located between these ribs; the depressions can also be shallower or deeper and a respective coolant channel 22 opens preferably into their front sections. The coolant channels 22 are connected to a main supply channel 24 extending centrally through the impact die. The same applies for the radially outer surface of the ribs 18 as for the peripheral surface of the impact die 10 of FIG. 1A. A radial taper from the front to the back is also present in the longitudinal direction of the ribs 18, in particular beginning at the cutting edge 14; however, but these ribs preferably have a small size, for example only one or two μ to 20 mm in length. The intent of this design is to guide the impact die on the bore wall along a large part of its length, especially with long bores having a relatively small diameter. The occurring friction is reduced by the depressions 20 between the ribs 18 to which a lubricating coolant is supplied.

The circumferential surface of the impact die 10 should be devoid of a cutting edge outside of the front face cutting edge, as shown in FIGS. 1A-D.

The embodiment of FIG. 3A is designed similar to the embodiment shown in FIG. 2A, but has the advantage that the front end of the impact die 10, where the cutting edge 14 is disposed, is composed of a layer or plate 15 of polycrystalline diamond (PCD) or of another extremely hard cutting material, such as cubic boron nitride (CBN), or is composed of a diamond film produced by a CVD process. Also, the PCD or CBN is mounted on a support consisting in particular of a hard metal and having the geometry of a cylindrical disk. Such cylindrical disk is indicated in FIG. 3A with the reference symbol 15'.

The layer thickness of a diamond layer produced of PCD or CBN or a CVD process should be between 0.1 and 3 mm, without limiting the scope of the invention. The thickness of the layer depends on the material in which the bore is to be introduced, i.e. its elasticity, so that upon withdrawal of the impact die 10 the elastic nestling of the material acts mainly on the cutting material. Furthermore, the distance between the joint or soldering zone 15" and the hard metal support 15', which is integrally connected with the impact die 10, should be at a distance 3-8 mm from the front face of the hard metal layer 15 in order to prevent unintended forces during withdrawal caused by the elastic return of the material into which the bore is introduced. In particular, the distance should be at least 3.2 mm or more. The connection zone or soldering zone 15" extends in the region of the shank of the impact die 10 which has a smaller diameter compared to the cutting edge.

If it is found in a specific situation that the most forward portion of the impact die also wears in the region where the diameter still essentially the same size as the diameter of the cutting edge 14, because the taper is practically noticeable only behind the cutting edge 14, the entire front region of the impact die should advantageously be made of the extremely hard cutting material.

The tool illustrated in FIG. 4A-F which largely corresponds to the tool of FIG. 3A-D, is obtained in that the impact die has at its front end behind the soldered plate 15 made of PCD on a hard metal substrate along a section 17 with a length of, for example, 4 mm initially a slightly larger diameter (for example, 6.05 mm) than the cutting edge (for example, 6.0 mm) made of PCD. Thereafter, juxtaposed depressions 26 which are uniformly distributed over the circumference on the peripheral section 17 are incorporated with lasers, for example 20 axially extending depressions that are each located in their central region below the diameter of the cutting edge 14, while radial projections 27 remain between the depressions 26 which protrude radially, for example by 0.01 to 0.5 mm, beyond the diameter of the cutting edge 14 (see FIGS. 4D, F, H). They thus produce during the working stroke of the tool a flat rifling in the bore wall, which is advantageous for the lubrication of the valve stems. The radial projections 27 between the laser-etched depressions 26 on the front section 17 of the impact die 10, as shown in FIG. 4D, F also need not necessarily extend axially in a straight line, but can according to FIG. 4H extend helically. If the tool is rotated during the forward and reverse stroke accordingly, a rifling with a twist is produced in the bore wall, which can have a positive effect on the movement of the valves guided in the produced bores.

Instead of the depressions 26 shown in FIG. 4D, F incorporated with a laser, a similar formation with projections protruding radially beyond the diameter of the cutting edge could also be obtained by material-removing machining of the periphery of the impact die 10 in this region 17.

In the embodiment of FIGS. 5A-E, the cutting edge 14 is ground so as to impart a polygonal shape approximating a circular shape with the nominal diameter Dn and composed of circular sections 26' in contact with the nominal diameter (for example 6 mm) having a larger diameter (e.g. 10 mm), and corner regions 27'. This is achieved by allowing the tool 10, 12, while grinding the cutting edge 14, to successively rotate, for example, about 12 eccentric axes of rotation located, for example, on a circle with a diameter of 2 mm about the central longitudinal axis of the tool 10, 12, so that the distance between the center of the grinding wheel and the center longitudinal axis of the impact die 10 changes during one revolution, and a polygon having 12 convex side edge 26' and corners 27' located slightly outside the nominal diameter Dn is generated as a result of the 12 grinding operations.

Figures 5D, 5E:
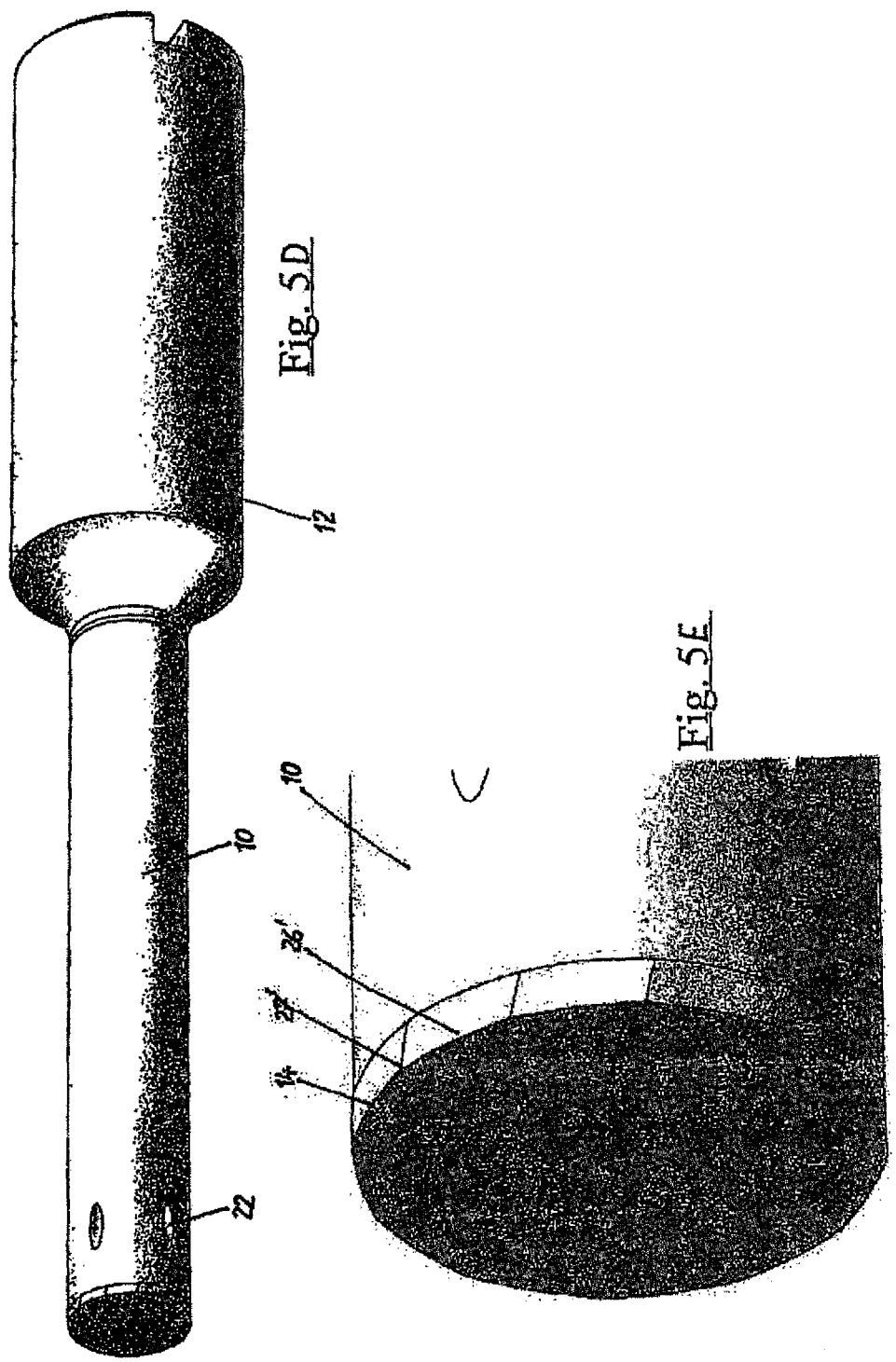
FIG. 5 A a central longitudinal section through a tool modified in comparison with FIG. 1A to the effect that the impact die has a polygonal cutting edge approximating a circular shape, and that open coolant channels open into the peripheral surface at the front of the impact die, FIG. 5B a side view of the tool of FIG. 5A, FIG. 5C a partial cross-section through the front polygonal region of the impact die taken along the section line C-C in FIG. 5B on an enlarged scale, FIG. 5D a perspective view of the tool according to FIGS. 5A-C, FIG. 5E the front end of the impact die of FIG. 5D on an enlarged scale.

The polygonal shape of the cutting edge is best seen in FIG. 5C and is also clearly evident in FIG. 5E. This form of the tool is suitable for generating rifling in the bore wall with or without twist by forming the corners 27' either with an axially straight or with a thread-like extension. The only exemplary number 12 of convex side edges of the polygon can also be chosen to be smaller or larger.

As previously described, to produce a bore with a precise fit, the impact die 10 having the cutting edge 14 performs substantially exclusively an axial stroke, on which optionally a rotary motion forming a twist in the inner wall of the bore is superimposed such that grooves or rifling are produced in the inner wall bore, wherein the slope angle should be between 1° and 75°, preferably between 10° and 15°.

A rotary motion, in particular at high rotation speed, should be carried out in addition to the stroke motion. The rotary motion can run synchronously or asynchronously with the impact movement. Synchronous indicates here that the rotary motion is superimposed on the impact movement such that the ratio of the stroke speed and rotation speed is constant. In an asynchronous motion, the relation between impact speed and rotation speed varies, which can facilitate advance and return. Static friction is avoided or reduced to a degree so that only dynamic friction occurs. As a result, the impact die 10 can be rotated during impact with a rotation speed of, for example, 2000 rpm or more or less, in particular a rotation speed of 30,000 rpm or more. The stroke should be in a range of 5 m/min or more, and in particular up to 150 m/min. However, the teaching according to the invention is not limited by these numerical values.

It may be appropriate or necessary in individual cases to form a bore to be finish-machined with the impact die as a blind bore. For such applications, a tool according to FIGS. 6A-H is proposed. It has an impact die 10 according to FIGS. 1A-D, FIGS. 2A-D or FIGS. 3A-D with the aforedescribed properties, variations and functions. The impact die 10 is merely combined with a milling head 30 for flat milling the bottom of the blind bore or with a drill head 32 having cutting edges that form an apex angle of for example 90° or 120°, or another suitable acute or obtuse angle. The cutting edges could be ground to a round shape so that the generated bottom of the blind bore assumes not the shape of a hollow cone, but instead the shape of a dome.

The milling or drill head 30 and 32, respectively, may be integrally formed with the impact die 10 or manufactured individually and firmly attached to the front end of the impact die 10, for example soldered. The diameter of the milling or drill head 30 and 32 should not be larger, preferably slightly less, than the cutting edge 14. In the exemplary embodiments according to FIGS. 6A-D, a ring-shaped depressed transition region 33 is provided between the cutting edge 14 and the milling and drill head 30, 32; in the embodiments of FIGS. 6E, F and 6 G, H the milling head 30 or drill head 32 is located immediately in front of the impact die 10. It will be understood that the blind bore is finish-machined by way of an impact and with an exact fit only as long as the impact die 10 moves axially forward. A specific portion of the bore wall away from the bottom remains without being finish-machined. Tests have shown that the impact die 10 with a milling and drill head 30 and 32 can already be driven with a rotation during the impact stroke, preferably at a low rotation speed.

Since the surface of the bottom of the blind bore is machined by rotating and axially advancing the tool, the rifling in the bore wall mentioned with reference to FIGS. 4A-H and FIGS. 5 A-E can be implemented for influencing the lubrication and, if necessary, to achieve a twist only on the longitudinal section of the bore, which the projections 27 and polygonal corner regions 27' that radially protrude beyond the nominal diameter pass during the impact stroke of the impact die 10.

The invention claimed is:

1. A method for material-removing machining of a cylindrical bore having a length that is a multiple of a diameter of the bore, the method comprising:
providing the cylindrical bore, which cylindrical bore is a pre-processed bore which includes a finishing allowance,
peeling off the finishing allowance to a nominal diameter of a finish-machined bore with an impact die that has at its front end a circular or substantially circular cutting edge and that performs an axial stroke in the direction of the length of the cylindrical bore,
wherein the cylindrical bore is a blind bore, and wherein the impact die is provided with a milling or drilling head attached axially forwardly of the circular or substantially circular cutting edge,
the method further comprising rotating the impact die to prepare a bottom of the blind bore via the milling or drilling head.

2. The method of claim 1, further comprising superimposing a rotary motion of the impact die on the axial stroke of the impact die, wherein the ratio of the feed speed of the impact die during the axial stroke to a rotation speed of the impact die during the rotary motion is either constant or varies.

3. The method of claim 2, wherein the rotary motion of the impact die superimposed on the axial stroke of the impact die has a rotation speed of at least 1 rpm.

4. The method of claim 2, wherein a rotation speed of the rotary motion is at least 2,000 rpm.

5. The method of claim 4, wherein the rotation speed is at least 30,000 rpm.

6. The method of claim 1, wherein a cutting speed during the axial stroke is 5 m/min to 150 m/min.

7. The method of claim 1, wherein a cutting speed during the axial stroke is 30 to 90 m/min.

8. The method of claim 1, wherein a cutting speed during the axial stroke for bore diameters of up to 20 mm is 50 to 80 m/min.

9. The method of claim 8, wherein during the axial stroke and a return stroke, friction between the bore wall and the impact die is limited by a taper of the impact die at its front end.

10. The method of claim 1, characterized in that during the axial stroke, the front end of the impact die is guided on a bore wall behind the cutting edge.

11. The method of claim 2, wherein the rotary motion of the impact die superimposed on the axial stroke of the impact die produces rifling with a twist in a bore wall.

12. The method of claim 11, wherein the rifling has a slope of between 1° and 75°.

13. The method of claim 11, wherein the rifling has a slope of between 10° and 15°.

14. The method of claim 1, wherein the diameter of the milling or drill head is less than the diameter of the cutting edge.

* * * * *